(12) United States Patent
Luthi et al.

(10) Patent No.: US 9,048,746 B2
(45) Date of Patent: Jun. 2, 2015

(54) ELECTRIC DEVICE HAVING AN INTERFERENCE SUPPRESSION CAPACITOR CIRCUIT

(75) Inventors: Daniel N. Luthi, Winterthur (CH); Fabien Maupas, Pontarlier (FR); Yves Theoduloz, Yverdon-les-Bains (CH); Manfred Schlenk, Augsburg (DE); Hans Hoffmann, Augsburg (DE); Mykhaylo Raykhman, Munich (DE); Josef Fisch, Petersberg/Erdweg (DE)

(73) Assignees: MINEBEA CO., LTD., Nagano-Ken (JP); EM MICROELECTRIC-MARIN S.A., Marin (CH)

( * ) Notice: Subject to any disclaimer, the term of this patent is extended or adjusted under 35 U.S.C. 154(b) by 56 days.

(21) Appl. No.: 13/582,490

(22) PCT Filed: Mar. 1, 2011

(86) PCT No.: PCT/EP2011/000995
§ 371 (c)(1),
(2), (4) Date: Nov. 12, 2012

(87) PCT Pub. No.: WO2011/107256
PCT Pub. Date: Sep. 9, 2011

(65) Prior Publication Data
US 2013/0057231 A1 Mar. 7, 2013

(30) Foreign Application Priority Data
Mar. 2, 2010 (DE) .......................... 10 2010 009 990
Mar. 2, 2010 (DE) .......................... 10 2010 009 991

(51) Int. Cl.
*G05F 1/565* (2006.01)
*H02M 1/36* (2007.01)
*H02M 1/44* (2007.01)

(52) U.S. Cl.
CPC .. *H02M 1/36* (2013.01); *H02M 1/44* (2013.01)

(58) Field of Classification Search
USPC ................ 323/210, 235, 246, 266, 276, 285, 323/288–290; 363/21.12–21.18; 361/679.4, 361/17, 111, 119; 307/100
See application file for complete search history.

(56) References Cited

U.S. PATENT DOCUMENTS

| | | | |
|---|---|---|---|
| 5,396,165 A * | 3/1995 | Hwang et al. ................. | 323/210 |
| 5,615,097 A * | 3/1997 | Cross ............................. | 363/84 |
| 6,087,802 A * | 7/2000 | James ........................... | 320/104 |
| 6,621,253 B2 * | 9/2003 | Mendenhall .................. | 323/210 |
| 7,019,992 B1 | 3/2006 | Weber | |
| 7,358,706 B2 * | 4/2008 | Lys ............................... | 323/222 |
| 7,602,596 B1 * | 10/2009 | Schley-May et al. ......... | 361/119 |
| 7,977,929 B2 * | 7/2011 | Turchi et al. .................. | 323/283 |
| 8,351,232 B2 * | 1/2013 | Zhang ........................... | 363/89 |

(Continued)

FOREIGN PATENT DOCUMENTS

| | | |
|---|---|---|
| EP | 0349707 | 1/1990 |
| EP | 1598926 | 11/2005 |

(Continued)

*Primary Examiner* — Adolf Berhane
*Assistant Examiner* — Nusrat Quddus
(74) *Attorney, Agent, or Firm* — Volpe and Koenig, P.C.

(57) ABSTRACT

An electrical device having at least one interference suppression capacitor (6, 60) that is actively discharged when there is an interruption to the mains voltage (7) by connecting an electrical load (69) in parallel. For this purpose, the device has a monitor for the mains voltage (7) and means for connecting (68) the electrical load.

11 Claims, 5 Drawing Sheets

(56) References Cited

U.S. PATENT DOCUMENTS

| | | | |
|---|---|---|---|
| 2004/0051513 A1* | 3/2004 | Rupp et al. | 323/288 |
| 2004/0205363 A1 | 10/2004 | Alperin et al. | |
| 2009/0021969 A1 | 1/2009 | Butler et al. | |
| 2010/0165673 A1* | 7/2010 | Chang et al. | 363/21.17 |
| 2010/0321964 A1* | 12/2010 | Brinlee et al. | 363/21.18 |
| 2012/0169240 A1* | 7/2012 | Macfarlane | 315/152 |
| 2012/0299503 A1* | 11/2012 | Aharon | 315/224 |
| 2013/0188401 A1* | 7/2013 | Jin et al. | 363/21.17 |
| 2014/0253032 A1* | 9/2014 | Bruwer et al. | 320/108 |

FOREIGN PATENT DOCUMENTS

| | | |
|---|---|---|
| JP | 2000308352 | 11/2000 |
| JP | 2001095261 | 4/2001 |
| JP | 2005050721 | 2/2005 |
| WO | 2010003785 | 1/2010 |

* cited by examiner

ELECTRIC DEVICE HAVING AN INTERFERENCE SUPPRESSION CAPACITOR CIRCUIT

BACKGROUND

The invention relates to an electrical device, particularly a television, that can be connected via a mains plug to a mains voltage and that has a stand-by mode or an energy saving mode and that has an interference suppression capacitor circuit, made up of at least one interference suppression capacitor, a power supply unit and a control unit for the stand-by mode or energy saving mode.

Electrical devices that are supplied from the main grid generally have at least one interference suppression capacitor to decrease electromagnetic interference. The use of an interference suppression capacitor is prescribed and regulated in most countries through appropriate norms.

The interference suppression capacitor generally has relatively large capacitance and is directly connected to the main grid. As long as the electrical device is connected to the main grid, the capacitor is charged and stores electrical energy. If the electrical device is disconnected from the main grid by pulling out the mains plug, the energy stored in the interference suppression capacitor can be discharged via the contacts of the mains plug. This means that if a person touches the contacts of the mains plug any charge from the capacitor found there flows as a current through this person who then receives an electric shock.

For safety reasons, it is thus stipulated that the capacitor has to be internally discharged a few seconds after the plug has been pulled out. To this effect, a discharging resistor is generally disposed parallel to the interference suppression capacitor.

A disadvantage here, however, is that a current permanently flows through this discharging resistor. In the case of an electrical device having a stand-by mode or energy saving mode, the current through the resistor contributes greatly to the stand-by current. The aim of modern devices is to keep the stand-by current as low as possible. To achieve this, however, a discharging resistor having correspondingly high impedance has to be used, whereupon the discharging process may then take too long.

SUMMARY

The object of the invention is thus to ensure that the required safety level is maintained at the lowest possible extra power consumption.

This object has been achieved according to the invention in that the electrical device has means for monitoring the mains voltage, so as to detect, at least in the stand-by mode or in the energy saving mode, an interruption to the mains voltage and has active means with which an electrical load can be connected in parallel to the at least one interference suppression capacitor, so that the at least one interference suppression capacitor can be actively discharged when an interruption to the mains voltage is detected.

In order to reduce the stand-by current, the device according to the invention does not have a discharging resistor connected permanently to the interference suppression capacitor. Particularly in the stand-by mode, the lack of current through the resistor brings about a significant reduction in the stand-by current.

To nevertheless ensure that safety is maintained, monitoring of the mains voltage is now proposed, so as to detect whether any interruption to the mains voltage takes place. As soon as a mains interruption is detected, according to the invention the interference suppression capacitor is now discharged through the connection in parallel of an electrical load, so as to comply with safety regulations.

Although a discharge is only needed when the mains plug is pulled out, differentiation cannot be made between this and a mains failure with the plug still plugged in, thus making it expedient for the discharge to always take place when the mains voltage fails.

If the plug is pulled out during normal operation of the device, the load of the electrical device is usually large enough to ensure a sufficiently rapid discharge of the interference suppression capacitor. In this case, an active discharge of the interference suppression capacitor is not required, even though it could also take place.

In the stand-by mode of the electrical device, however, the energy consumption of the device is mostly too low for a rapid discharge of the interference suppression capacitor. It is thus expedient if the electrical device according to the invention is designed such that a discharge of the interference suppression capacitor only takes place when a sufficient load is not available, particularly when the device is in stand-by mode. The stand-by mode is controlled by the control unit, so that the actual operating mode is always known and a suitable reaction can take place.

According to the invention, monitoring of the mains voltage is thus carried out at least in the stand-by mode, although it could also take place during normal operation.

The electrical device according to the invention has a switch through which an electrical load can be connected in parallel to the interference suppression capacitor. As soon as an interruption to the mains voltage is detected this switch is operated, at least in the stand-by mode, and the interference suppression capacitor discharges internally via the electrical load. Here the electrical load can be chosen such that there is a very short discharge time, up to the point of a short circuit of the interference suppression capacitor, where a very high current can flow for a short duration. Within the required time, there is then no more voltage at the plug contacts and there is no longer any risk of an electric shock.

In the simplest case, this electrical load can be a resistor that can be connected in parallel to the interference suppression capacitor. In contrast to the prior art, however, this discharging resistor is not permanently available in the electric circuit, but only for the discharge of the interference suppression capacitor and can have low impedance accordingly.

The electrical device according to the invention has, however, a power supply unit having a power factor correction circuit and/or a DC/DC converter. Thus the connectable electrical load forms at least one part of the power supply unit, particularly at least one part of the power factor correction circuit and/or at least one part of the DC/DC converter. This makes it possible to dispense entirely with a special discharging resistor, thus making the circuit simpler and more cost-effective.

In the electrical device, two mains switches could additionally disconnect the connection to the mains plug, so that there is instantly no voltage present at the plug contacts, while the interference suppression capacitor is discharged internally via the electrical load.

The means for monitoring the mains voltage is preferably capacitively or inductively coupled to the mains voltage. However, other means could be provided that are sufficiently well known to the skilled person.

In an advantageous embodiment of the invention, the electrical device has a capacitive voltage divider that is connected to the mains voltage and that has a rectifier at which a voltage signal for monitoring the mains voltage can be tapped.

The interference suppression capacitor circuit is permanently connected to the mains voltage. Thus a permanent reactive current flows through it which is also added to the stand-by current. In order to further reduce the stand-by current, the electrical device may have an additional switch for changing the overall capacitance of the interference suppression capacitor circuit in the stand-by mode or energy saving mode. Such an arrangement can be easily combined with the arrangement according to the invention for actively discharging the interference suppression capacitor.

For this purpose, an additional interference suppression capacitor having lower capacitance, for example, is connected in series to the interference suppression capacitor and the additional switch is connected in parallel to the series interference suppression capacitor, so that when the additional switch is open, the interference suppression capacitor is connected in series to the series interference suppression capacitor. When the switch is open, the series interference suppression capacitor together with the interference suppression capacitor forms a series connection made up of two capacitances. The overall capacitance of the series connection is then determined as the reciprocal of the sum of the reciprocals of the individual capacitances. The series interference suppression capacitor is preferably at least one to two orders of magnitude smaller than the interference suppression capacitor. Thus the overall capacitance of the series connection approximately corresponds to the capacitance of the series interference suppression capacitor. The reactance of the series connection increases accordingly by the same order of magnitude and only a small amount of current flows. The interference suppression capacitor is thus practically switched off. The advantage is that not only is the current through the interference suppression capacitor decreased, but at the same time interference having a very high frequency also continues to be diverted, in other words a residual function is still maintained.

In an alternative interference suppression capacitor circuit, an additional interference suppression capacitor having lower capacitance is connected in parallel to the interference suppression capacitor and the additional switch is designed for switching over between the two interference suppression capacitors.

Here, the interference suppression capacitor and the additional interference suppression capacitor may each have an additional switch, so that the interference suppression capacitors may be individually switched on and off.

Particularly in the last two variants, it is expedient if the switch or the additional switch is switched in zero crossing of the mains voltage, so as to avoid high current peaks.

In all the embodiments, a suppressor diode, for example, may be provided to additionally divert any voltage peaks.

The invention can be used to particular advantage in an electrical device, particularly a television, having a power supply unit that has a voltage converter and at least one interference suppression capacitor and having a control unit disposed on the primary side that has its own power supply circuit connected directly to the mains voltage and which can be controlled through an external signal, wherein the electrical device has an energy saving mode (stand-by mode) and the control unit is designed such that when the electrical device enters the energy saving mode, it switches off the electrical energy on the secondary side of the power supply unit. An electrical device of this kind is particularly known from WO 2010/003785 A2.

In this device there is no discharging resistor at least in the energy saving mode, which is why there is no additional current through the discharging resistor. Furthermore, a device is expediently provided here for changing the interference suppression capacitor, which leads to a further reduction in the stand-by current. Moreover, the power supply circuit of the control unit expediently has a capacitive voltage divider having a rectifier, at which a voltage signal for monitoring the mains voltage is available.

BRIEF DESCRIPTION OF THE DRAWINGS

The invention is described in more detail below with reference to the enclosed drawings.

The drawings show.

DETAILED DESCRIPTION OF THE PREFERRED EMBODIMENTS

Figure 1:
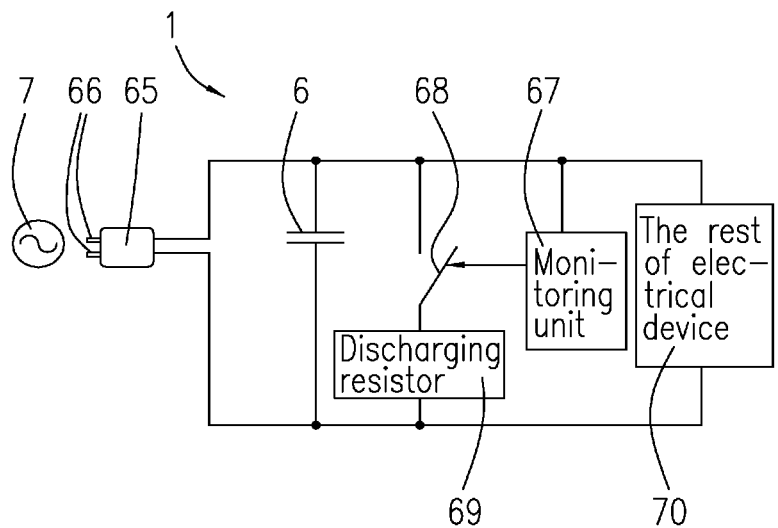
FIG. 1 a schematic circuit diagram of an electrical device according to the invention, FIG. 2 a schematic circuit diagram of an electrical device according to the invention having an interference suppression capacitor circuit having two interference suppression capacitors, FIG. 3 an alternative interference suppression capacitor circuit, FIG. 4 another interference suppression capacitor circuit, FIG. 5 a block diagram of a television according to the invention, FIG. 6 a schematic detail of the block circuit of FIG. 5, and FIG. 7 a circuit diagram of the flyback converter of the television.

In FIG. 1, a block diagram of an electrical device according to the invention 1 is shown. The device 1 can be connected via a mains plug 65 to the main grid 7. In the device 1 directly at the mains input, an interference suppression capacitor 6 is disposed. The rest of the electrical device 70 is arbitrary and thus not described in more detail here. The device according to the invention, furthermore, has a stand-by mode or an energy saving mode that is controlled by a control unit 3.

If the mains plug 65 is pulled out, the energy stored in the interference suppression capacitor 6 gathers at the contacts 66 of the mains plug 65. Should someone touch these contacts 66, this person would receive an electric shock. To prevent this, the electrical device 1 has a monitoring unit 67 for the mains voltage 7 which makes it possible to determine whether there is an interruption to the mains voltage 7. For this purpose, the monitoring unit 67 is connected to the mains voltage 7. Since it is impossible to differentiate between pulling out the mains plug and any interruption to the mains with the plug being plugged in, for the sake of simplicity any interruption to the mains voltage is monitored.

The monitoring unit 67 is, moreover, connected to a switch 68 by means of which an electrical load, such as a discharging resistor 69, can be connected in parallel to the interference suppression capacitor 6. As soon as the monitoring unit 67 detects an interruption to the mains voltage 7, the switch 68 is closed and the interference suppression capacitor 6 discharges via the discharging resistor 69. In order to speed up this process, the discharging resistor 69 may have a low resistance value. Ideally, the resistance value is chosen such that the maximum charge of the capacitor 6 can be discharged within the specified period of time. Thanks to this measure, there is no charge present at the plug contacts 66 within a very short time, such as within a few milliseconds, so that if touched, there is no longer any risk of an electric shock.

This takes place at least in the stand-by mode, since during normal operation, the load through the electrical device is usually sufficiently large to allow the interference suppression capacitor 6 to be discharged rapidly enough through the electrical device itself and thus an active discharge of the interference suppression capacitor 6 by means of an electrical load is not necessary.

Since the discharging resistor 69 is now only connected for discharging the interference suppression capacitor 6 and is not a permanent part of the circuit, as has been the case in the prior art to date, the power consumption of the electrical device is reduced by the amount of power used by the discharging resistor.

Figure 2:
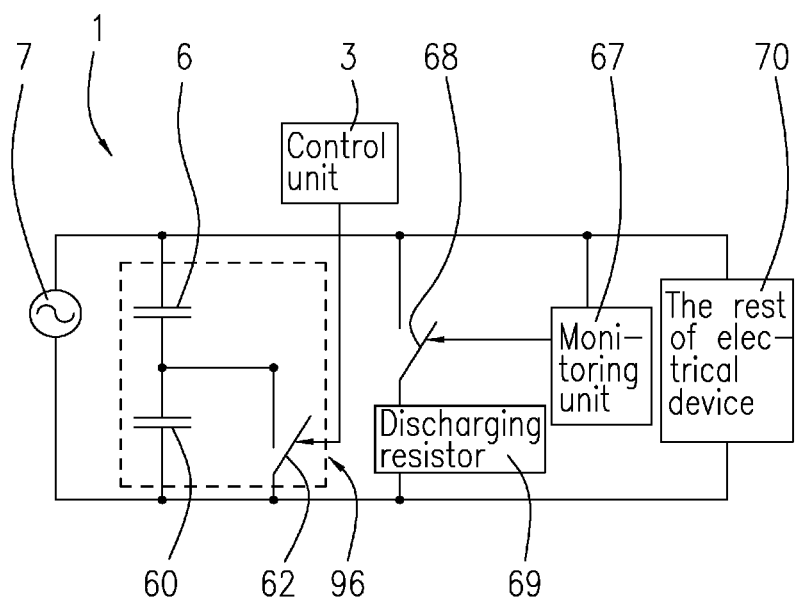

In FIG. 2 a variant on a device according to the invention is shown, having an interference suppression capacitor circuit having two interference suppression capacitors. In this interference suppression capacitor circuit, the overall capacitance can be changed by an additional switch 62. The interference suppression capacitor 6 is connected in series to a series interference suppression capacitor 60 that has approximately 0.1 to 0.01 times the capacitance of the interference suppression capacitor 6. The additional switch 62 is connected in parallel to the series interference suppression capacitor 60 and is controlled by a control unit 3.

If the switch 62 is closed, current flows through the interference suppression capacitor 6 and the additional switch 62, so that the series interference suppression capacitor 60 is bridged. The interference suppression capacitor 6 operates normally in this position.

In the stand-by mode, the power consumption of the electrical device is very low, so that interference is also low. In this case, the switch 62 is opened. The series interference suppression capacitor 60 is thereby connected in series to the interference suppression capacitor 6. Through the series connection of the two capacitors the overall capacitance is now determined by the reciprocal of the sum of the reciprocals of the individual capacitances, so that altogether it is low. This change in the interference suppression capacitor now produces an overall capacitance that is lower by several orders of magnitude, as a result of which the current through the capacitors is also decreased by the corresponding order of magnitude. The power consumption in stand-by mode of the device according to the invention is thereby further significantly decreased compared to the prior art.

If an interruption to the mains voltage is now detected, the currently active interference suppression capacitor can be discharged via the switch 68 as previously, it not being necessary to connect the additional switch 62. In specific cases, however, it could be advantageous if the additional switch 62 is also operated when there is a mains interruption.

Figure 3:
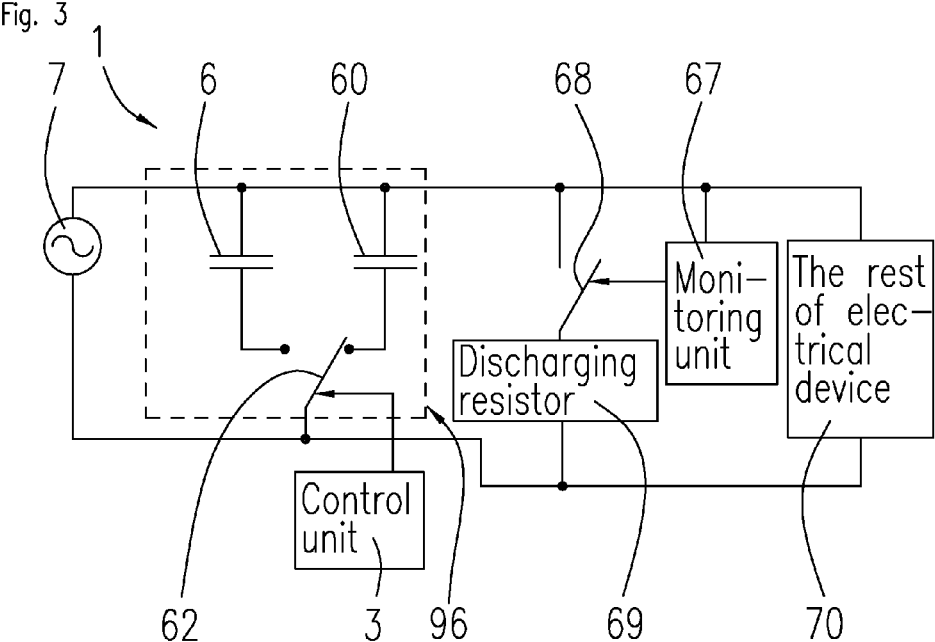
Figure 4:
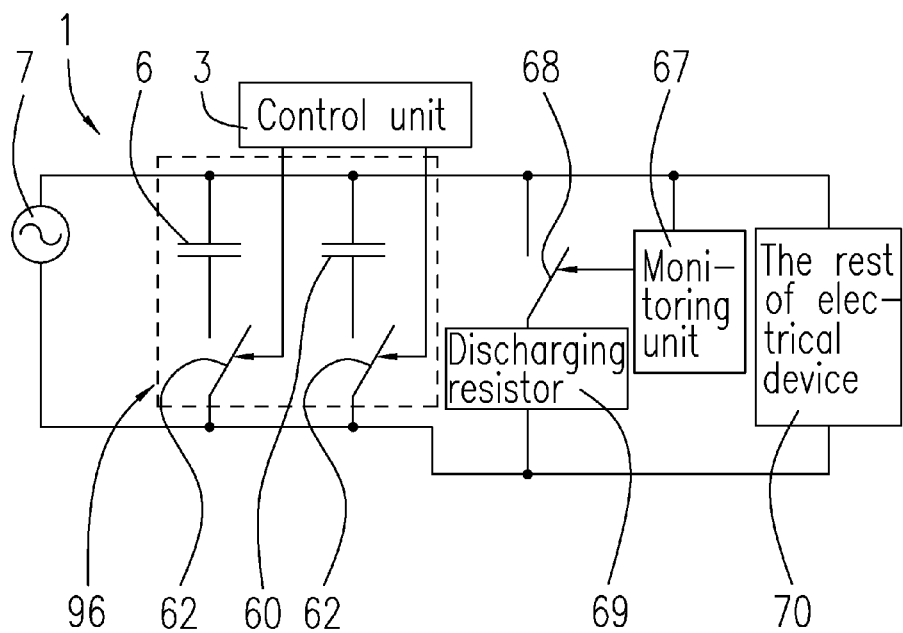

In FIGS. 3 and 4, alternative interference suppression capacitor circuits 96 are shown that also make it possible to change the overall capacitance. In the circuit according to FIG. 3 an additional interference suppression capacitor 60 having lower capacitance is connected in parallel to the interference suppression capacitor 6. The switch 62 is disposed such that it is possible to switch over between the two interference suppression capacitors. Thus in normal operation, the larger interference suppression capacitor 6 can be switched on, so as to utilize the full filter effect. In the stand-by mode, the smaller interference suppression capacitor 60 is then switched over to, which goes to significantly reduce the current through the interference suppression capacitor as a whole.

Instead of the two-way switch, the circuit according to FIG. 4 has a separate switch 62 for each interference suppression capacitor, so that by alternately switching the two switches 62, switch over can also be made between them. However, in this arrangement both interference suppression capacitors 6, 60 could also be connected in parallel, so that overall capacitance is increased. In the case of a device that has several operating modes, it is now possible to choose, for example, between three respectively adapted suppression capacitances.

In all cases it is advantageous if the additional switch or the additional switches 62 is/are switched in zero crossing of the mains voltage 7, so as to prevent high reactive currents.

In all three variants it is advantageous if the capacitances of the two interference suppression capacitors differ by at least one order of magnitude. In particular the difference in capacitances lies between one and three orders of magnitude, where it is clear that other ratios are possible.

Figure 5:
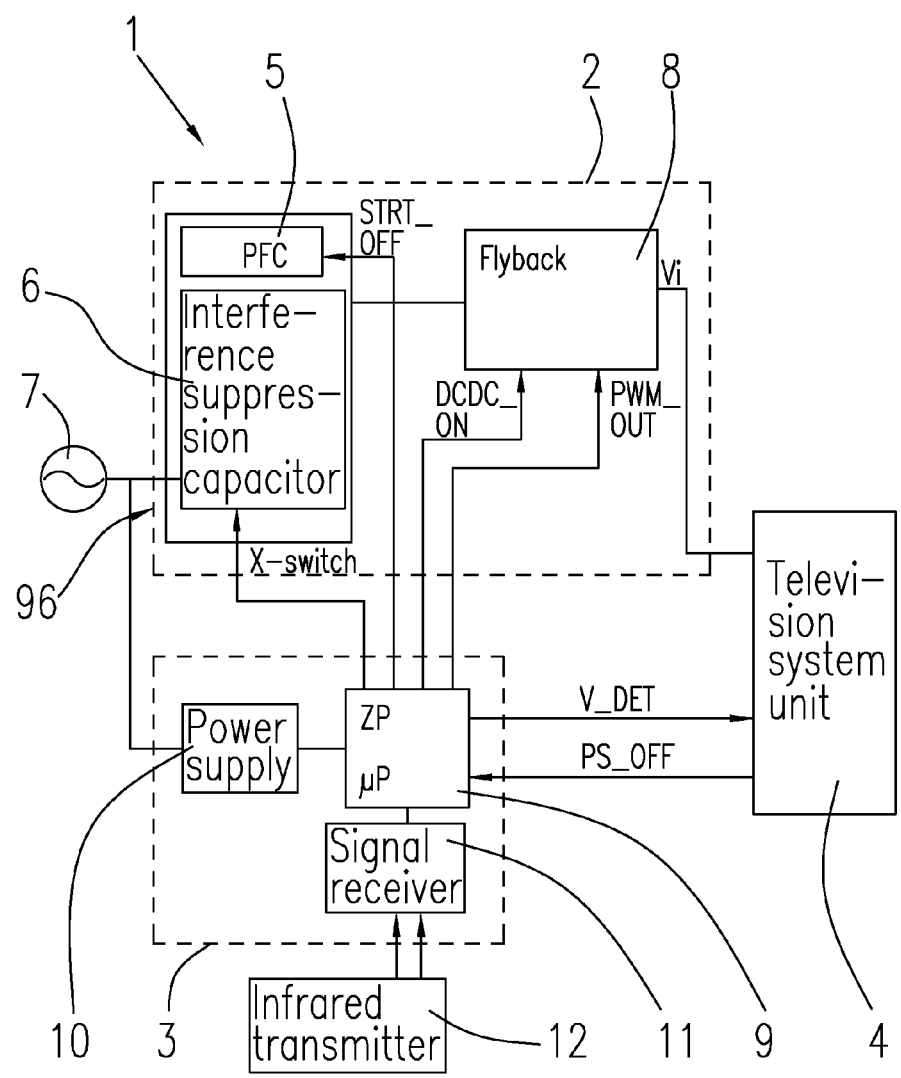
Figure 6:
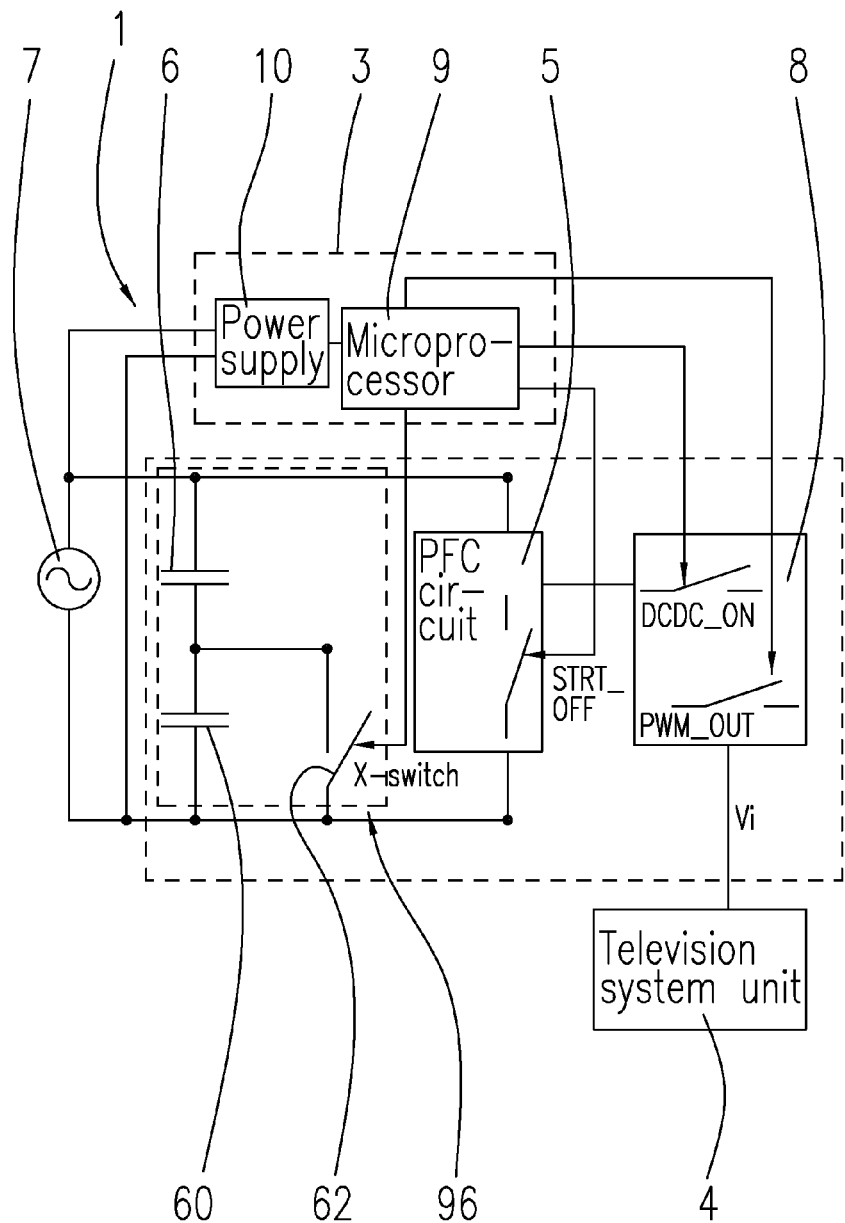

FIG. 5 now shows a block diagram of a television 1 which is used by way of example for a device according to the invention having an energy saving mode (stand-by mode). However, the invention is in no way limited to such a television. Rather the invention can also be used in DVD players, receivers and every other device having an energy saving mode. The television 1 essentially has a power supply unit 2, a control unit 3 and a television system unit 4.

The power supply unit 2 has at least one interference suppression capacitor circuit 96 having at least one interference suppression capacitor (X capacitor) 6, a power factor correction circuit (PFC) 5 and a flyback converter 8 having a converter module. The converter module has a special start circuit, in order to activate the flyback converter. The flyback converter 8 generates, for example, an intermediate voltage Vi for the television unit 4, which is reconverted or reduced there into individual voltages.

Moreover, the television 1 has a control unit 3 that is formed on the primary side separate from the television system unit 4 and the power supply unit 2. The control unit 3 has a microprocessor or microcontroller 9. Furthermore, the control unit 3 has its own power supply circuit 10 that is directly connected to the mains voltage 7. To control the control unit, a signal receiver 11 is provided for receiving wireless or wired signals, such as an infrared transmitter 12.

Instead of one switch 68, the television 1 has a plurality of switches, by means of which individual parts of the power supply unit 2 can be switched. In the example, switch STRT_OFF switches the voltage divider of the power factor correction circuit 5, switch DCDC_ON switches the power supply of the converter module and PWM_OUT switches the start circuit of the converter module. In the stand-by mode, these switches are open, so that no energy is needed on the secondary side.

The television moreover has an additional switch 62 that is designed to change the overall capacitance of the interference suppression capacitor circuit 96. In the stand-by mode, the power consumption of the television is very low, so that interference is also low. In this case, the interference suppression capacitor 6 is reduced by connecting the series interference suppression capacitor 60 in parallel, so as to reduce the reactive current.

The power supply 10 of the control unit 3 has a capacitive voltage divider 71 that is designed such that just enough power for the processor 9 is provided. Since no converter losses occur in the capacitive voltage divider 71, power consumption in stand-by mode is very low.

Figure 7:
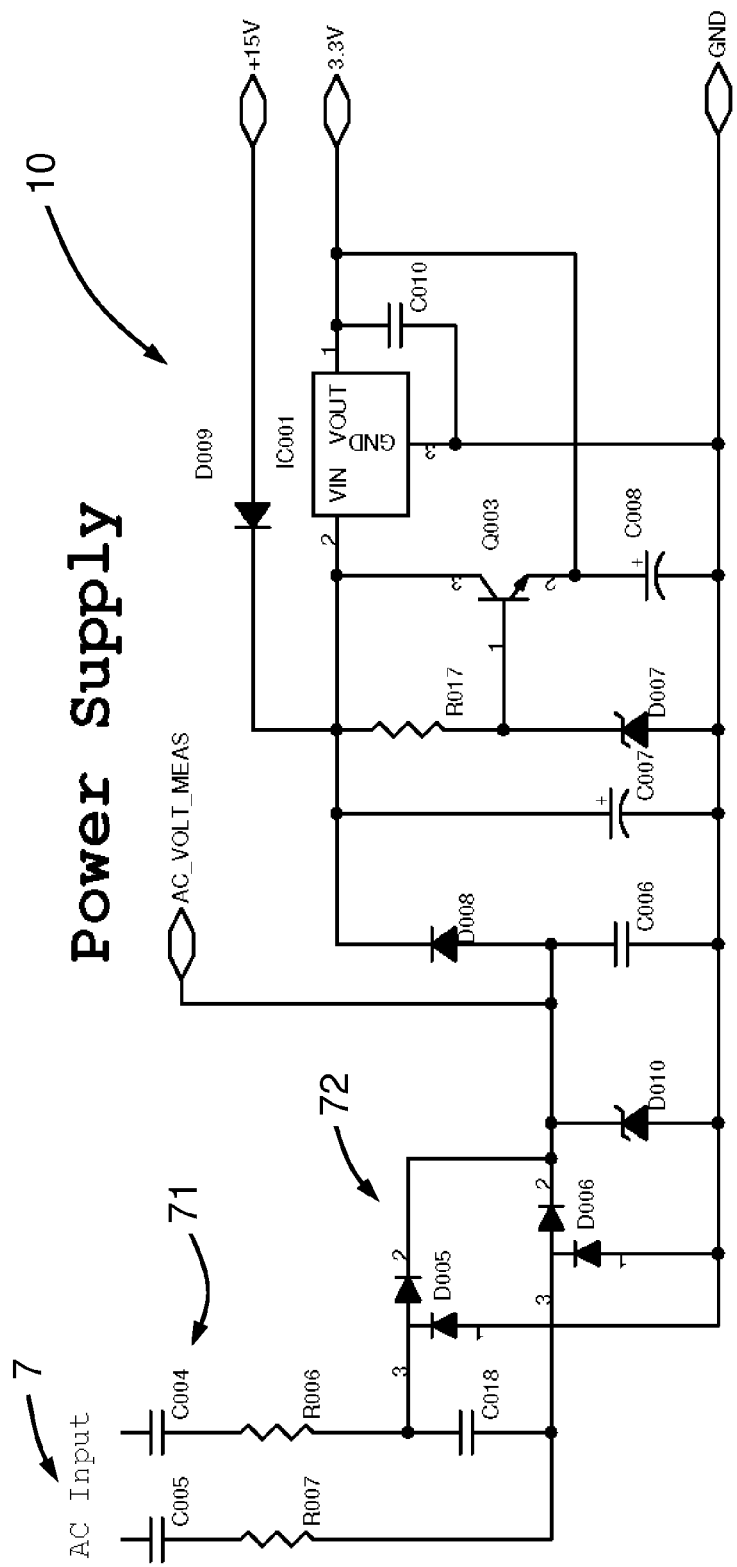

An exemplary embodiment of such a power supply is shown in FIG. 7. This power supply 10 is realized using a capacitive coupling via the capacitors C005 and C004 directly from the mains voltage 7. The diode network D005 and D006 acts as a rectifier 72 to generate a DC voltage. The zener diode D010 acts as an overvoltage protector, where the capacitor C018 reduces the current through this zener diode D010. The electrolytic capacitor C007 and the diode D008 go to smooth the DC voltage. To regulate the voltage, a conventional linear regulator taking the form of an integrated circuit IC001 is provided. Using only a few external components, this circuit generates a 3.3 V operating voltage for the zero power microprocessor 9.

In the stand-by mode, power is supplied via the mains voltage 7, where, thanks to the purely capacitive coupling, practically no power dissipation occurs.

If the television is running in normal operation, i.e. the flyback converter 8 has been started, the processor 9 is supplied via a 15 V DC voltage from the primary power supply that is fed via the diode D009 into the circuit.

In addition, at the rectifier 72, the signal AC_VOLT_MEAS is provided that is used for monitoring the mains voltage 7. An interruption of the mains voltage 7 causes the signal AC_VOLT_MEAS to be cancelled, which indicates, for example, that the mains plug has been pulled out.

Consequently, the signal AC_VOLT_MEAS is monitored permanently or periodically by the control unit 3 at least in the stand-by mode. As soon as the signal AC_VOLT_MEAS is cancelled, a mains interruption has taken place and the at least one interference suppression capacitor 6,60 has to be actively discharged, at least in the stand-by mode, for the sake of safety. For this purpose the switches STRT_OFF, DCDC_ON and PWM_OUT are closed by the control unit 3, which results in the voltage divider of the PFC 5, the converter module of the flyback converter 8 and its start circuit being connected as electrical loads. This ensures an increase in power consumption, so that the interference suppression capacitor 6,60 is discharged within the required period of time.

IDENTIFICATION REFERENCE LIST

1 Electrical device
2 Power supply unit
3 Control unit
4 Television system unit
5 PFC circuit
6 Interference suppression capacitor
7 Mains voltage
8 Voltage converter
9 Microprocessor
10 Power supply
11 Signal receiver
12 Infrared transmitter
60 Series interference suppression capacitor
62 Switch
65 Mains plug
66 Plug contacts
67 Monitoring unit
68 Switch
69 Discharging resistor
70 the rest of Electrical device
71 Capacitive voltage divider
72 Rectifier
96 Interference suppression capacitor circuit
STRT_ON Switching signal for PFC circuit
X-Switch Switching signal for interference suppression capacitor (XCAP_ON)
PWM_OUT Switching signal for start circuit (EV_ON)
DCDC_ON Switching signal for voltage converter (HV_OUT)
V_DET,
PS_OFF Control signals for television unit
Vi Intermediate voltage for television unit

The invention claimed is:

1. An electrical device that is connectable via a mains plug (65) to a mains voltage (7) and that has a stand-by mode or an energy saving mode the electrical device comprising an interference suppression capacitor circuit (96), made up of at least one interference suppression capacitor (6, 60), a power supply unit (2) and a control unit (3) for the stand-by mode or the energy saving mode, a monitor for detecting the mains voltage, so as to detect, at least in the stand-by mode or energy saving mode, an interruption to the mains voltage (7) and has an active switching element (68) with which an electrical load (69; 5, 8) can be connected in parallel to the at least one interference suppression capacitor (6), so that the at least one interference suppression capacitor (6) is actively discharged when an interruption to the mains voltage (7) has been detected and the power supply unit (2) has a power factor correction circuit (5) and a DC/DC converter (8) and the electrical load forms at least one part of at least one of the power factor correction circuit (5) or at least one part of the DC/DC converter (8).

2. An electrical device according to claim 1, wherein the active switching element is made up of at least one switch (68).

3. An electrical device according to claim 1, wherein the electrical load forms at least one part of the power supply unit (2).

4. An electrical device according to claim 1, wherein the monitor for detecting the mains voltage is capacitively or inductively coupled to the mains voltage (7).

5. An electrical device according claim 1, wherein the electrical device has a capacitive voltage divider (71) that is connected to the mains voltage (7) and has a rectifier (72) at which a voltage signal (AC_VOLT_MEAS) for monitoring the mains voltage can be tapped.

6. An electrical device according to claim 1, wherein the electrical device has an additional switch (62) for changing an overall capacitance of the interference suppression capacitor circuit (96) in the stand-by mode or energy saving mode.

7. An electrical device according to claim 6, wherein an additional interference suppression capacitor (60) having lower capacitance is connected in series to the interference suppression capacitor (6) and the additional switch (62) is connected in parallel to the series interference suppression capacitor (60), so that when the additional switch (62) is open, the interference suppression capacitor (6) is connected in series to the series interference suppression capacitor (60).

8. An electrical device according to claim 6, wherein an additional interference suppression capacitor (60) having lower capacitance is connected in parallel to the interference suppression capacitor (6) and the additional switch (62) switches over between the two interference suppression capacitors.

9. An electrical device according to claim 8, wherein the interference suppression capacitor (6) and the additional interference suppression capacitor (60) each have an additional switch (62), so that the interference suppression capacitors can be individually switched on and off.

10. An electrical device according to claim 6, wherein the switch or the additional switch (62) is switched in zero crossing of the mains voltage (7).

11. An electrical device according to claim 1, wherein the power supply unit (2) has a voltage converter (8) and a control unit (3) disposed on the primary side, that has its own power supply circuit (10) connected directly to the mains voltage (7) and that can be controlled through an external signal, the control unit (3) being configured so that when the electrical device enters into the stand-by mode or energy saving mode, the control unit switches off electrical energy on a secondary side of the power supply unit (2).

* * * * *